(12) United States Patent
Kalwa et al.

(10) Patent No.: US 11,224,988 B2
(45) Date of Patent: Jan. 18, 2022

(54) METHOD FOR PRODUCING A WOODEN COMPOSITE MATERIAL BOARD, IN PARTICULAR AN MDF OR HDF BOARD

(71) Applicant: SWISS KRONO Tec AG, Lucerne (CH)

(72) Inventors: Norbert Kalwa, Horn-Bad Meinberg (DE); Axel Siebert, Röbel (DE)

(73) Assignee: SWISS KRONO TEC AG, Lucerne (CH)

( * ) Notice: Subject to any disclaimer, the term of this patent is extended or adjusted under 35 U.S.C. 154(b) by 0 days.

(21) Appl. No.: 16/629,833

(22) PCT Filed: Jul. 12, 2018

(86) PCT No.: PCT/EP2018/069010
§ 371 (c)(1),
(2) Date: Jan. 9, 2020

(87) PCT Pub. No.: WO2019/016083
PCT Pub. Date: Jan. 24, 2019

(65) Prior Publication Data
US 2020/0346364 A1 Nov. 5, 2020

(30) Foreign Application Priority Data

Jul. 20, 2017 (EP) ..................................... 17182396

(51) Int. Cl.
*B27N 3/18* (2006.01)
*B27N 3/14* (2006.01)
(Continued)

(52) U.S. Cl.
CPC ................. *B27N 3/18* (2013.01); *B27N 3/14* (2013.01); *B27N 3/06* (2013.01); *B27N 7/005* (2013.01);
(Continued)

(58) Field of Classification Search
CPC ... B27N 3/18; B27N 3/14; B27N 3/06; B27N 7/005; B32B 2037/243; B32B 2307/554; B32B 2317/16
See application file for complete search history.

(56) References Cited

U.S. PATENT DOCUMENTS 2,618,813 A * 11/1952 Patton ...................... B27N 3/00
264/120
3,649,396 A * 3/1972 Carlsson ................... B27N 3/14
156/62.2
(Continued)

FOREIGN PATENT DOCUMENTS

| CN | 101223250 | 7/2008 |
| CN | 101433892 | 5/2009 |

(Continued)

OTHER PUBLICATIONS

International Search Report in related International Application No. PCT/EP2018/069010 dated Jan. 24, 2019, 7 pages.
(Continued)

*Primary Examiner* — Marc C Howell
*Assistant Examiner* — Abhishek A Patwardhan
(74) *Attorney, Agent, or Firm* — Andrew M. Calderon; Roberts Calderon Safran & Cole, P.C.

(57) ABSTRACT

The disclosure relates to a method for producing a wooden composite material board, in particular an MDF or HDF board, wherein a cake made of wood chips or wood fibres wetted with a binder is spread, which is subsequently pressed in a hot press to form a board of a desired thickness, wherein, before the pressing, a mixed powder made of colour pigments and a second binder is spread onto an upper side of the cake as a primer, wherein the cake is sprayed with water after the spreading of the mixed powder.

20 Claims, 3 Drawing Sheets

(51) Int. Cl.
*B27N 3/06* (2006.01)
*B27N 7/00* (2006.01)
*B32B 37/24* (2006.01)

(52) U.S. Cl.
CPC ... *B32B 2037/243* (2013.01); *B32B 2307/554* (2013.01); *B32B 2317/16* (2013.01)

(56) References Cited

U.S. PATENT DOCUMENTS

| | | | |
|---|---|---|---|
| 4,359,151 A | 11/1982 | Fyie et al. | |
| 7,893,169 B2 | 2/2011 | Molhoek et al. | |
| 10,569,452 B2 | 2/2020 | Vetter et al. | |
| 2008/0226827 A1 | 9/2008 | Molhoek et al. | |
| 2009/0130304 A1 | 5/2009 | Muth et al. | |
| 2014/0199558 A1* | 7/2014 | Pervan | E04C 2/246 428/530 |
| 2017/0334088 A1* | 11/2017 | Lehnhoff | B27N 7/005 |
| 2017/0361489 A1* | 12/2017 | Weinkotz | B27N 3/005 |
| 2018/0195291 A1* | 7/2018 | Loncke | B32B 21/08 |
| 2018/0345530 A1* | 12/2018 | Schrul | B27N 3/02 |
| 2020/0254657 A1 | 8/2020 | Vetter et al. | |

FOREIGN PATENT DOCUMENTS

| | | | |
|---|---|---|---|
| CN | 105283280 | 1/2016 | |
| CN | 105804352 | 7/2016 | |
| DE | 2523515 | 1/1976 | |
| DE | 2922814 | 12/1980 | |
| DE | 102009052413 | 5/2011 | |
| EP | 2226201 | 9/2010 | |
| EP | 2236313 | 10/2010 | |
| EP | 3189952 | 7/2017 | |
| JP | S5663858 | 5/1981 | |
| JP | 2008149487 | 7/2008 | |
| RU | 2437755 | 12/2011 | |
| RU | 2559440 | 8/2015 | |
| WO | 2014025309 | 2/2014 | |
| WO | WO-2014025309 A1 * | 2/2014 | ............ B05C 19/04 |

OTHER PUBLICATIONS

Written Opinion in related International Application No. PCT/EP2018/069010 dated Jan. 24, 2019, 7 pages.
Chinese Office Action in CN Application No. 201880048271.0 dated Dec. 9, 2020, 7 pages.
Decision to Grand in RU Application No. 2019139187/10 dated Nov. 10, 2021, 9 pages.

* cited by examiner

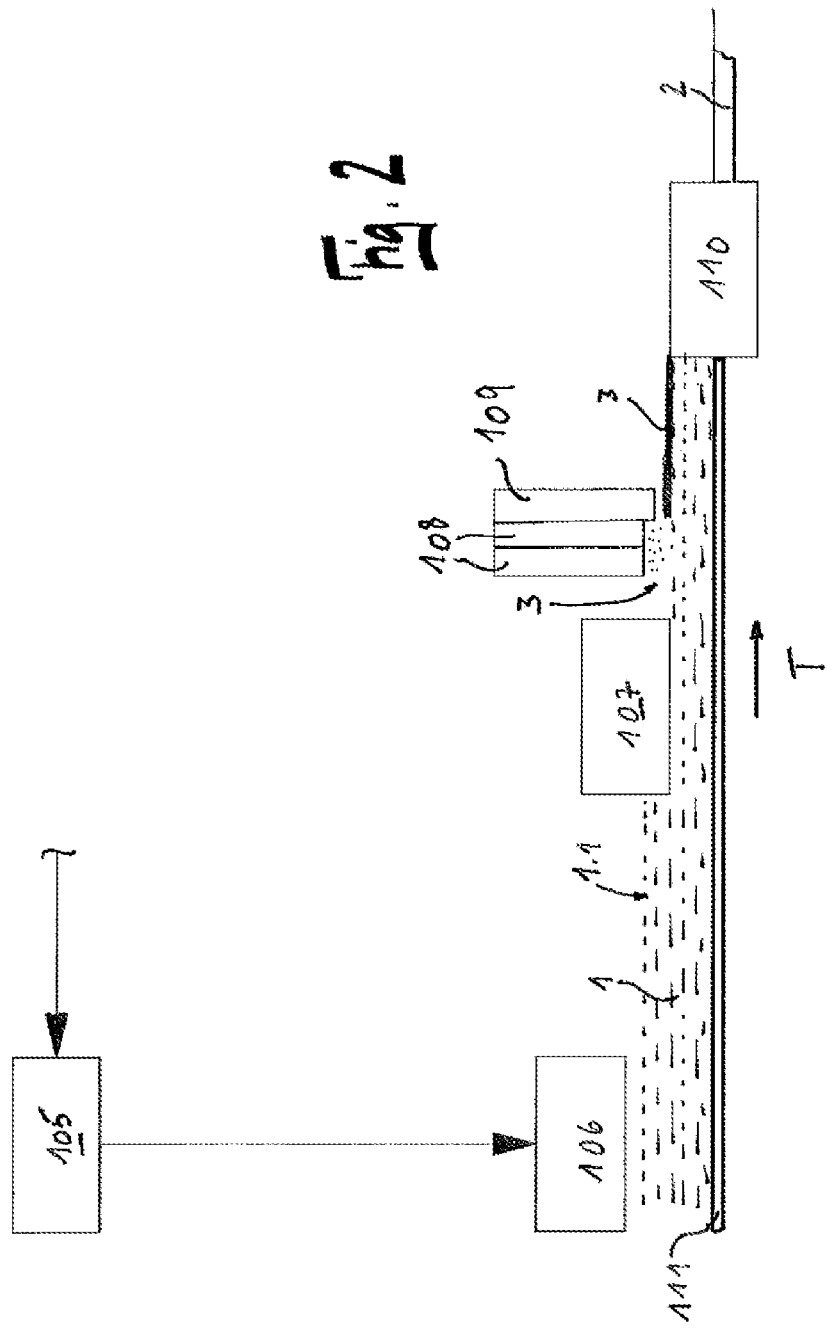

METHOD FOR PRODUCING A WOODEN COMPOSITE MATERIAL BOARD, IN PARTICULAR AN MDF OR HDF BOARD

FIELD OF INVENTION

The invention relates to a method for producing a wood-based board, especially an MDF or HDF board, by scattering a mat of wood fibers or wood chips wetted with a binder, which is subsequently pressed in a hot-press to form a board of desired thickness, the pressing being preceded by the scattered application, to a top side of the mat, of a powder mixture of color pigments and a second binder as priming agent.

BACKGROUND OF INVENTION

A method of this kind is known from EP 3 189 952 A1, for example. It can be used to produce smooth surfaces without the need for subsequent surface machining. That document also contains the application of the amount of pigment necessary for sufficient hiding power in the form of an aqueous slurry. Such a slurry also brings a considerable amount of water onto the surface of the scattered mat. At least some of the water must be removed again by drying, since otherwise there may be steam splits in the fiber board. If water in substantial amounts is applied asymmetrically to the fiber mat, an asymmetric steam pulse may develop during pressing. This too is an adversity during manufacture.

In the case of the method known from DE 10 2009 052 413 B4, a priming agent is applied contactlessly, before pressing, to the scattered mat of wood chips or wood fibers. The priming agent used may be an emulsion paint or a varnish. Emulsion paints are generally fairly viscous paints or coatings, consisting of a chemical dispersion (usually an emulsion) of binders and solvents, colorants (usually pigments), and additives. This liquid priming agent may be sprayed onto the top side of the mat by means of spraying nozzles or by means of an atomizing apparatus.

The wood-based boards produced by this method can be coated or printed and then divided up into individual panels and used, for example, to form flooring.

JP 2008 149487 A discloses a method wherein a paste like coating composed of an inorganic powder—the natural stone—and an uncured binder is applied to the top side of a wood-based board. This paste is applied at a thickness that allows unevennesses to be compensated. After the binder has cured, the surface is ground to smoothness.

JP S56 63858 A discloses a method for producing non-flammable building materials, using Portland cement and high-purity silica powder.

Initial operations in the production of laminate flooring used resin-impregnated papers, which were pressed at high pressure and high temperature in a press known as a short-cycle press onto wood-based supports such as thin particle boards or high-density fiber boards. The impregnates used comprised, on the top side, an overlay as antiwear layer, a decorative paper as the base for the design, and on the reverse side a counterbalancing layer for stress symmetry. This kind of manufacture entails the inevitable drawback that during the impregnating step, all of the papers are subject to uncontrolled growth in length and width as a result of the treatment with aqueous synthetic resins. With a given area coverage, especially in the length, this results in a displacement of the printed image on the individual panel. To eliminate this deficiency, EP 2 236 313 B1 proposes printing directly onto the top side of the wood-based board. In that case the top side is primed directly with aqueous formulations of synthetic resin and pigment, and dried. Atop the primer the decoration is printed and the printed wood-based board is then pressed in a short-cycle press. The application of the primer entails a very involved operation, necessitating the successive application of a plurality of layers and the interim drying of each of these layers. After the last application of the primer, or after decorative printing, the wood-based board, which has become very hot as a result of the multiple heating in forced-air driers, must be extensively cooled. This makes the manufacturing operation decidedly expensive in terms of energy and equipment. A plant designed for this operation may run to a length of 150 to 200 meters. Production speeds of 60 to 90 m/min are commonplace. The footprint and the energy demand of the plant are therefore considerable. The individual pigmented primer layers are applied in succession by means of roll application machines. In the event of production shutdown, therefore, substantial cleaning on the machines is required. The same applies to unintended interruptions to operation, since the liquors that are used for priming change in their viscosity through solvent evaporation and consequently there are changes in the hiding power as well.

EP 2 226 201 B1 discloses, rather than the decorative printing of a ready-pressed wood-based board, the printing of the decoration on the scattered fiber mat. To prepare the printing surface, the top side of the scattered fiber mat may be provided with a layer of relatively fine fibers with additions such as pigments, resins, or salts. A drawback of this method is that a mixture of such complexity tends readily toward separation.

SUMMARY

Starting from this problem scenario, the method of the generic kind is to be improved in such a way as to produce a wood-based board having a primed top side, the process avoiding the drawbacks outlined. In particular, the primer is to have uniformity and a very light shade, to simplify the printing of the ready-pressed wood-based board. Furthermore, existing operations are not to be disadvantaged with the improved method, and there is to be no need for substantial capital investments.

To solve the problem, the method of the generic kind is characterized in that the mat after the scattered application of the powder mixture is sprayed with water.

The use of a powder completely eliminates solvents; the cleaning effort described disappears, as do harmful emissions through evaporation during coating. Appropriate selection of the pulverulent color pigments and of the thickness of the scattered powder mixture layer allows the hiding power of the primer to be adjusted. If a light-colored decoration is to be later printed onto the pressed wood-based board, the primer ought to be very light in color. If a darker decoration is being printed on, the primer may also be darker and/or have less hiding power, allowing the powder mixture layer scattered to be thinner. As a result of the later wetting of the scattered-on powder mixture, pigment application and water application are decoupled. The amount of water applied need only be that which is actually required for the steam pulse. As a result, the process becomes significantly more cost-effective. Furthermore, the powder scattered on is fixed, and dusting on entry of the mat into the downstream hot-press is avoided.

The water is sprayed on preferably in an amount of 10 to 30 g/m$^2$.

If the first binder and the second binder are at least substantially identical in composition, problems of adhesion between the pressed layers are avoided. The term "substantially" here is intended to acknowledge the possibility of small differences in the composition of the two binders; the base material, in other words the resin used, for example, is identical.

The powder mixture preferably consists of 80 to 90 wt % of pigments and of 10 to 20 wt % of the second binder. To enable the achievement of a maximum hiding power on the part of the primer layer, the pigments especially preferably are white.

As first and/or second binder it is possible to use pulverulent melamine resin, urea resin, acrylates, ethylene-vinyl acetate copolymers, and the like.

The powder mixture is scattered on preferably in an amount of between 5 and 120 $g/m^2$.

The pulverulent pigments used in the powder mixture may consist of an individual pigment or of a mixture of different pigments.

Pigments used may comprise titanium oxide, calcium carbonate, barium sulfate or the like. Where calcium carbonate is used as pigment, the amount of the powder mixture applied is 60 to 80 $g/m^2$, for a target value of L according to the CIELAB color system an amount of around 90, and in the case of a powder mixture consisting only of titanium dioxide and the second binder, an amount of 12 to 16 $g/m^2$ is required.

If the primer is not required to be brilliant white, the white pigments may be admixed, for example, with (inexpensive) iron oxide pigments, producing a slightly tinted color to the primer.

An apparatus for applying the scattered powder mixture consists at least of the following:
a) a hopper,
b) a roll which is arranged rotatably beneath the hopper and is provided with indentations over its periphery,
c) a doctor which brushes over the indentations,
d) a brush which travels through the indentations,
e) a screen arranged beneath the roll and driven in oscillation.

The screen is arranged preferably between 5 and 10 cm above the top side of the mat. A scattering apparatus for producing a web of chips that can be pressed to form particle boards is known from DE 29 22 814 A1. DE 25 23 515 A1 describes an apparatus for scattering a mat of chips, with a rotating drum to allow the chips to be directionally aligned during scattering.

BRIEF DESCRIPTION OF DRAWINGS

Exemplary embodiments of the invention are briefly elucidated below with the aid of a drawing, in which:

FIG. 2—shows a schematized partial representation of the manufacturing operation, FIG. 3—shows the schematic sectional representation of a scattering apparatus transverse to the transport direction, and FIG. 4—shows the section along the line IV-IV according to FIG. 3.

DETAILED DESCRIPTION

Figure 1:
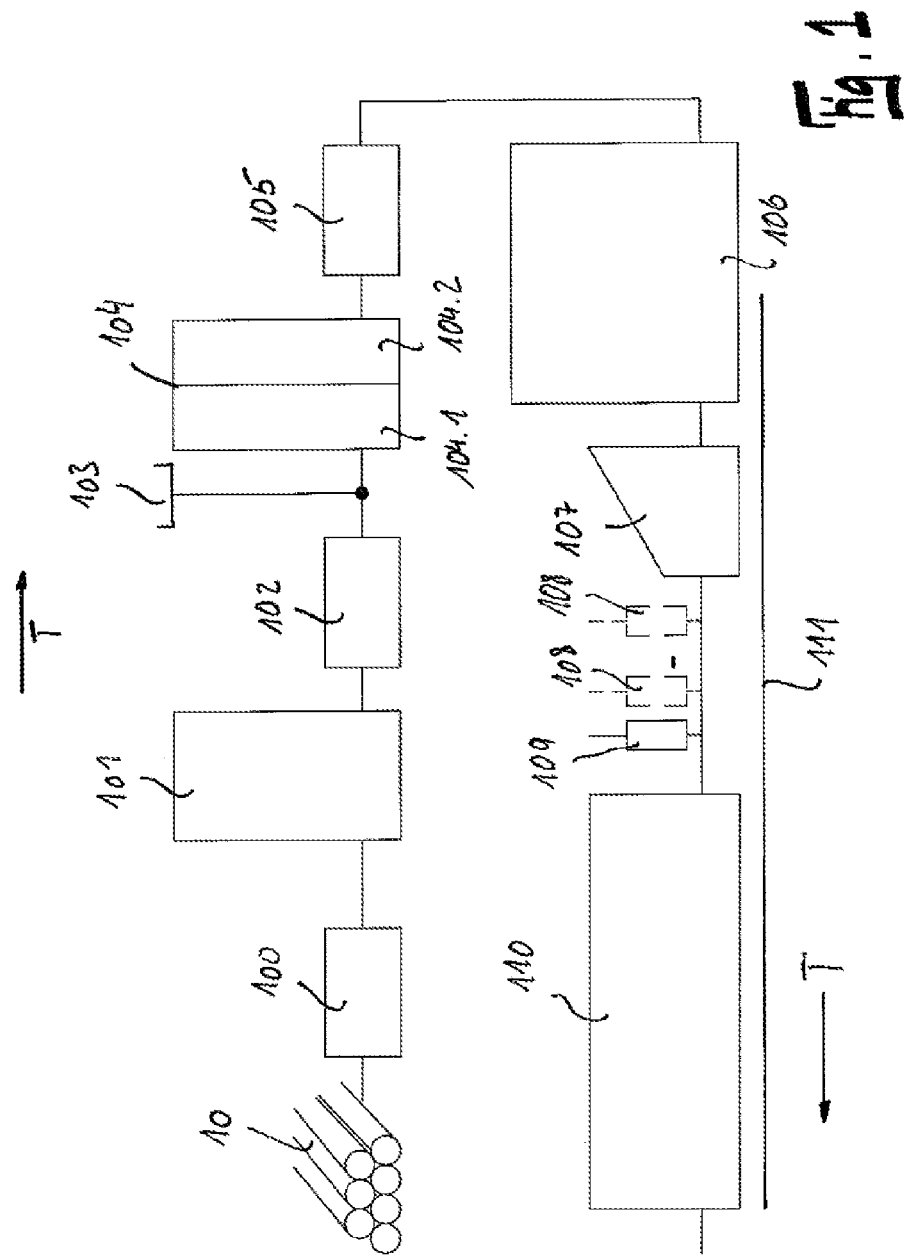
FIG. 1—shows an operating scheme for producing a wood fiber board.
Figure 4:
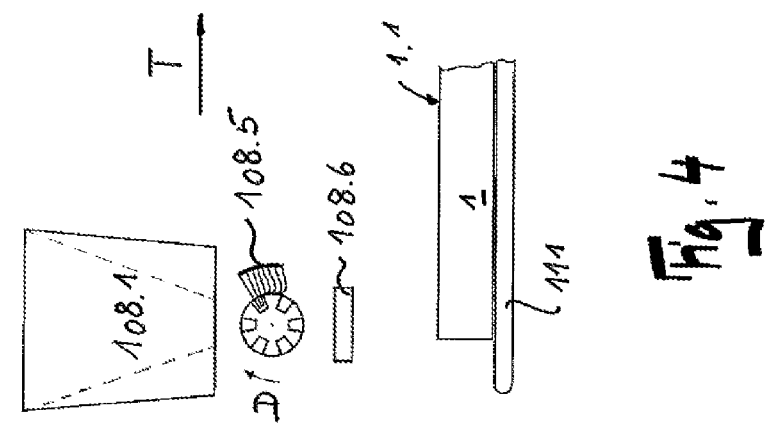
Figure 3:
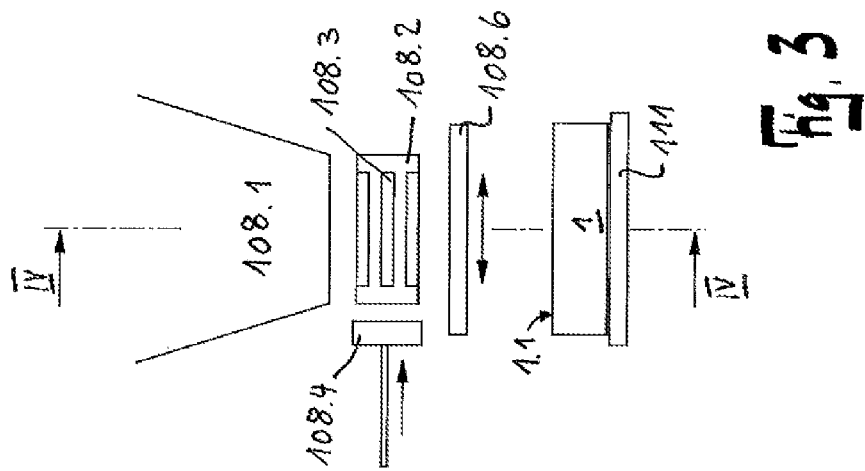

The method of the invention is elucidated using FIG. 1. Wood 10 provided in log form is first comminuted to wood chips HS in a chipper 100, which are washed and boiled in a downstream boiler 101. The wood chips HS thus made ready are then transferred into the refiner 102, in which they are defibrated to form wood fibers HF. In transport direction T, the wood fibers HF are resinated in a resinating apparatus 103 with a first binder, examples being melamine resin, urea resin, acrylate, and ethylene-vinyl acetate copolymer. The resinated wood fibers HF are transported on and then dried in a drier 104. The drier 104 consists of a preliminary drier 104.1 and a secondary drier 104.2. In the drier 104, any residual moisture content is removed from the wood fibers HF, and the first binder is dried. After the drier 104, the wood fibers HF are transported for classification into the classifier 105, from which they pass into the first scattering apparatus 106. This scattering apparatus 106 then scatters the wood fibers HF onto a conveyor belt 111, which is not shown in any more detail here but which circulates in the transport direction T, to form a mat 1. This fiber mat 1 then enters the preliminary press 107, which carries out precompaction of the mat 1. Downstream of the preliminary press 107 in the transport direction T there is at least one second scattering apparatus 108, in which the priming agent 3 is provided and is scattered onto the top side 1.1 of the mat 1 by means of the second scattering apparatus 108. There are preferably two or three second scattering apparatuses 108 arranged one after another in the transport direction T. The priming agent is a powder mixture composed of pigments and a second binder. The powder mixture consists to an extent of 80 to 90 wt % of pigments and of 10 to 20 wt % of the second binder, and is scattered on in an amount of between 5 and 120 $g/m^2$. The amount scattered on is dependent on the desired hiding power of the primer. When the powder mixture has been scattered onto the mat 1, the top side 1.1 is sprayed with water via the spraying device 109, the amount sprayed on being about 10 to 30 $g/m^2$. The mat 1 is subsequently transported into the hot-press 110, which is preferably a continuous press, where it is pressed under high pressure and high temperature to form a wood-based board 2 of desired thickness.

The construction of the scattering apparatus 108 can be taken schematically from FIG. 2. It consists of a hopper 108.1 for receiving the powder mixture, a roll 108.2, which is arranged beneath the hopper 108.1 and is provided with indentations 108.3 over its periphery, a doctor 108.4 which brushes over the indentations 108.3, a brush 108.5 which travels through the indentations 108.3, and a screen 108.6, which is arranged beneath the roll 108.2 and is driven in oscillation. The distance between the screen 108.6 and the top side 1.1 of the mat 1 is approximately between 5 and 10 cm.

The powder mixture for scattering onto the mat 1 is introduced into the hopper 108.1. The powder mixture falls into the indentations 108.3 in the rotating roll 108.2. The amount of powder mixture applied is controlled through the rotational speed of the roll. Via the doctor 108.4, the amount applied over the production width is kept constant, by the drawing of the doctor 108.4 over the indentations 108.3. The brush 108.5, which is arranged in the turning direction D of the roll 108.2, brushes the powder mixture out of the indentations 108.3 by travelling through them. The powder mixture then falls onto the screen 108.6, which oscillates transversely to the transport direction T and so evens out inhomogeneities in the scattering on the top side 1.1 of the mat 1.

The scattered amount varies, depending on the required hiding power and on the pigment used, between 5 and 120 g of powder mixture per square meter. In the case of a target value of L according to the CIELAB color system of around 90, the amount required of a powder mixture consisting only of titanium oxide and binder is from 12 to 16 g/m². When calcium carbonate is used as pigment, the applied amount of the powder mixture is 60 to 80 g/m². After passage through the continuous press 110, the major part (>90%) of the powder mixture is fixed on the top side 1.1 of the mat 1. The remainder is located on the circulating pressing belt of the continuous press 110, and will be deposited on the top side 1.1 during the next circulation. This operation makes the surface more uniform and/or reduces the cloudiness of the primer. Through the use of more than two second scattering apparatuses 108, powder mixture with more inexpensive pigments can be used in the leading scattering apparatus 108 in transport direction T, and high-value titanium dioxide pigment can be employed in the last scattering apparatus 108.

Of course, only part of the desired primer can be applied even by the scattered application of the powder mixture. In spite of scattering onto the porous mat 1, trials found no significant penetration of the powder mixture into the mat 1 (the board). In contrast to applicator rolls, a scattering apparatus has significantly smaller fluctuations in application. As a result it is possible to achieve a reduction in the amount of priming agent applied. The problems which may occur on wet application of primers, through changes in viscosities due to temperature fluctuations, evaporation of venting agents, or aging phenomena of the liquors, are eliminated by the application of the powder mixture. A switch in production from primed boards to unprimed boards is possible within a few minutes, requiring only the removal from operation of the scattering apparatuses 108 and possibly the spraying apparatus 109. Moreover, a change in the hiding power is achievable rapidly and readily by varying the amount of the powder mixture applied. Remnants of liquid primers need not be disposed of. Plants do not have to be cleaned, and even the pressing belt of the continuous press 110 is pigment-free again after one circulation.

WORKING EXAMPLE 1

Ahead of the continuous press 110, the scattered mat 1 of wood fibers HF, having a mat thickness of around 10 cm, was scattered by means of two scattering apparatuses 108 with a powder mixture of calcium carbonate (85 wt %) and melamine resin powder (15 wt %) in an amount of 50 g/qm. Each of the two scattering apparatuses 108 scattered 25 g/m² of powder mixture. A third scattering apparatus 108 contained a powder mixture in which the calcium carbonate had been replaced by titanium oxide. This powder mixture was scattered in an amount of 5 g/m² onto the mat 1 with the calcium carbonate-melamine resin powder mixture. Then, in the spraying apparatus 109, water was sprayed in an amount of 30 g/m² onto the powder mixture. The mat 1 was subsequently pressed in the continuous press 110 to form an HDF 8 mm thick. After the press, a sample was taken and a determination made of the value of L according to the CIELAB system. A value of 89.3 was measured. The wood-based boards 2, which in spite of one-sided coating exhibited no warping, were freed from loose constituents on the surface after cooling in a pressure section by a cleaning abrasion, after which they were provided with a synthetic resin primer (melamine resin, about 20 g/m², solids content about 65 wt %). The primer was then dried in a forced-air drier, given a finishing primer, and dried again. Thereafter it was printed by gravure with a decoration and provided with a masking/transport layer, and finally it was dried and cooled. The board 2 was then pressed to a laminate with an overlay and a counterbalancing layer in a further production step in a short-cycle press.

WORKING EXAMPLE 2

Ahead of a continuous press 110, the top side 1.1 of a mat 1 consisting of wood fibers HF and having a thickness of around 13 cm was scattered, using two scattering apparatuses 108, with an amount of a mixture of titanium oxide (85 wt %) and melamine resin powder (15 wt %) of 15 g/m², with each scattering apparatus 108 scattering 7.5 g/m². Water was then sprayed onto the scattered powder mixture in an amount of 15 g/m² by way of the spraying apparatus 109. The mat 1 was subsequently pressed in a continuous press 108 to form an HDF board 10 mm thick. After the continuous press 110, a sample was taken and a determination made of the value of L according to the CIELAB system. A value of 90.1 was measured. The wood-based boards 2, which in spite of one-sided coating exhibited no warping, were freed from loose constituents on the surface after cooling in a pressure section by a cleaning abrasion, after which they were provided with a synthetic resin primer (melamine resin, about 20 g/m², solids content about 25 wt %). The primer was then dried in a forced-air drier, given a finishing primer, and dried again. Thereafter it was printed by digital with a decoration and provided with a masking/transport layer, and finally it was dried and cooled. The wood-based board 2 was then pressed to a laminate with an overlay and a counterbalancing layer in a further production step in a short-cycle press.

WORKING EXAMPLE 3

Ahead of a continuous press 110, a mat 1 of wood fibers HF with a thickness of around 13 cm was scattered by means of three scattering apparatuses 108 with a mixture of calcium carbonate (85 wt %) and melamine resin powder (15 wt %) in an amount of 75 g/m², with each scattering apparatus (108) scattering 25 g/cm². 30 g of water per m² were then sprayed onto the scattered powder mixture by means of the spraying apparatus 109. The mat 1 was subsequently pressed in the continuous press 110 to form an HDF board 10 mm thick. After the continuous press 110, a sample was taken and a determination made of the value of L according to the CIELAB system. A value of 86.1 was measured. The wood-based boards 2, which in spite of one-sided coating exhibited no warping, were freed from loose constituents on the surface after cooling in a pressure section by a cleaning abrasion, after which they were coated with a synthetic resin primer (melamine resin: about 20 g/m², solids content: about 65 wt %). The primer was then dried in a forced-air drier, given a finishing primer, and dried again. Thereafter it was printed by digital with a decoration and provided with a masking/transport layer, and finally it was dried and cooled. The wood-based board 2 was then pressed to a laminate with a liquid overlay and a liquid counterbalancing layer in a further production step in a short-cycle press.

The invention claimed is:

1. A method for producing a wood-based board by scattering a mat of wood fibers or wood chips wetted with a first binder, which is subsequently pressed in a hot-press to form a board of desired thickness, the pressing being preceded by the scattered application, to a top side of the mat, of a powder mixture of color pigments and a second binder as priming agent, wherein the mat, after the scattered application of the powder mixture, is sprayed with water in an amount of 10 to 30 g/m², on the powder mixture of color pigments and the second binder, prior to the pressing to form the wood-based board, wherein a steam pulse is developed during the pressing due to the spraying of the water in an amount of 10 to 30 g/m², and the mat of wood fibers or wood chips wetted with the first binder is subjected to a pre-pressing to carry out a precompaction prior to the scattered application and the spraying of the water.

2. The method as claimed in claim 1, wherein the first binder and the second binder are at least substantially identical.

3. The method as claimed in claim 1, wherein the powder mixture comprises 80 to 90 wt % of pigments and 10 to 20 wt % of the second binder.

4. The method as claimed in claim 2, wherein the pigments are white.

5. The method as claimed in claim 1, wherein pulverulent melamine resin, urea resin, acrylate, or ethylene-vinyl acetate copolymers are used as first and/or second binder.

6. The method as claimed in claim 1, wherein the powder mixture is scattered on in an amount of between 5 and 120 g/m².

7. The method as claimed in claim 3, wherein the pigments comprise pulverulent pigments comprising an individual pigment or a mixture of different pigments.

8. The method as claimed in claim 4, wherein the pigments comprise titanium oxide, calcium carbonate, or barium sulfate.

9. The method as claimed in claim 4, wherein the white pigments are admixed with iron oxide pigments.

10. The method as claimed in claim 1, wherein the wood-based board is MDF or HDF board.

11. The method as claimed in claim 1, wherein the water is sprayed prior to hot pressing to form the wood-based board.

12. The method as claimed in claim 1, wherein the scattered application comprises two scattering processes onto the mat of wood fibers, prior to the pressing in a hot press.

13. The method as claimed in claim 12, wherein the two scattered processes comprises a first scattering process with a first powder mixture comprising first pigments used with a leading scattering apparatus in a transport direction and a second scattering process with a second powder of a second pigment used with a last scattering apparatus.

14. The method as claimed in claim 1, wherein the wood fibers or wood chips wetted with the first binder are dried prior to the scattering application.

15. The method as claimed in claim 14, wherein residual moisture content is removed from the wood fibers or wood chips and the first binder is dried.

16. The method as claimed in claim 15, wherein the dried wood fibers or wood chips and the first binder are scattered into a conveyor system.

17. The method as claimed in claim 16, wherein the dried wood fibers or wood chips and the first binder are subjected to the precompaction, prior to the scattering of the powder mixture of color pigments and the second binder onto the top side of the mat.

18. The method as claimed in claim 17, wherein the powder mixture comprises 80 to 90 wt % of pigments and 10 to 20 wt % of the second binder, and is scattered in an amount of between 5 and 120 g/m².

19. The method as claimed in claim 18, wherein the powder mixture is controlled through rotational speed of a roller with indentations and a doctor blade drawing over the indentations of the roller to maintain a constant width during production.

20. The method as claimed in claim 19, further comprising brushing the powder mixture out of the indentations by a brush travelling through the indentations such that the powder mixture falls onto a screen which oscillates transversely to a transport direction which evens out inhomogeneities in the scattering application on the top side of the mat.

* * * * *